Oct. 13, 1970 NORIO TSUBOUCHI ET AL 3,533,951

PIEZOELECTRIC CERAMICS

Filed Oct. 21, 1968 6 Sheets-Sheet 1

INVENTORS
NORIO TSUBOUCHI
MASAO TAKAHASHI
TOMEJI OHNO
TSUNEO AKASHI

BY Hopgood & Calimafde
ATTORNEYS

PIEZOELECTRIC CERAMICS

INVENTORS
NORIO TSUBOUCHI
MASAO TAKAHASHI
TOMEJI OHNO
TSUNEO AKASHI

BY Hopgood & Calimafde
ATTORNEYS

INVENTORS
NORIO TSUBOUCHI
MASAO TAKAHASHI
TOMEJI OHNO
TSUNEO AKASHI
BY
Hopgood & Calimafde
ATTORNEYS Oct. 13, 1970 NORIO TSUBOUCHI ET AL 3,533,951

PIEZOELECTRIC CERAMICS

Filed Oct. 21, 1968 6 Sheets-Sheet 4

INVENTORS
NORIO TSUBOUCHI
MASAO TAKAHASHI
TOMEJI OHNO
TSUNEO AKASHI

BY Hopgood & Calimafde
ATTORNEYS

INVENTORS
NORIO TSUBOUCHI
MASAO TAKAHASHI
TOMEJI OHNO
TSUNEO AKASHI
BY Hopgood & Calimafde
ATTORNEYS

INVENTORS
NORIO TSUBOUCHI
MASAO TAKAHASHI
TOMEJI OHNO
TSUNEO AKASHI

BY Hopgood & Calimafde
ATTORNEYS

United States Patent Office 3,533,951
Patented Oct. 13, 1970

3,533,951

PIEZOELECTRIC CERAMICS

Norio Tsubouchi, Masao Takahashi, Tomeji Ohno, and Tsuneo Akashi, Tokyo, Japan, assignors to Nippon Electric Company, Limited, Tokyo, Japan

Filed Oct. 21, 1968, Ser. No. 769,205
Int. Cl. C04b *35/00*
U.S. Cl. 252—62.9 2 Claims

ABSTRACT OF THE DISCLOSURE

Piezoelectric ceramics are provided consisting essentially of a solid solution of $$Me(Mn_{1/2}Ti_{1/2})O_3—Me(Mn_{1/2}Zr_{1/2})O_3—PbTiO_3—PbZrO_3$$

Figure 3:
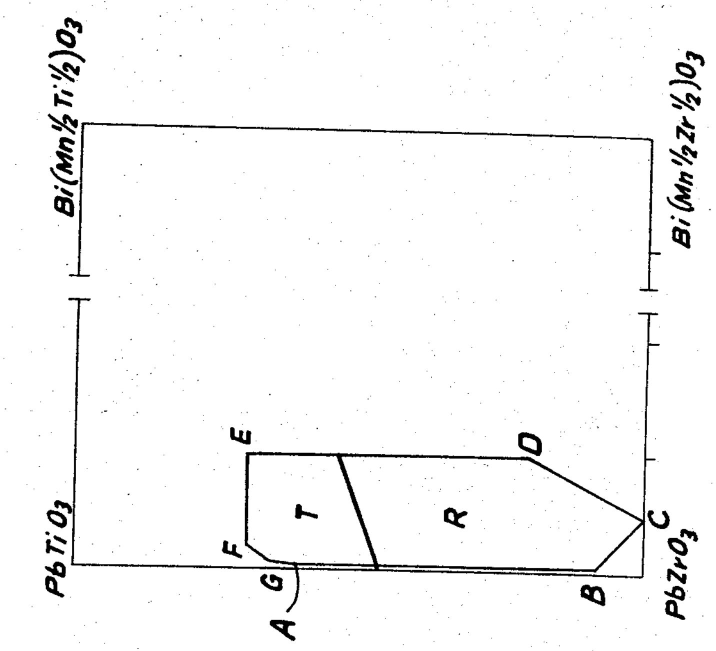

quaternary, where Me represents one element selected from the group consisting of Bi, La, Ce, Nd and Sm.

This invention relates to piezoelectric materials, and more particularly to novel piezoelectric ceramics having improved piezoelectric properties.

Piezoelectric properties of piezoelectric materials are evaluated according to the electromechanical coupling factor and the mechanical quality factor. The former is indicative of the efficiency of transforming electrical oscillation into mechanical vibration and of conversely transforming mechanical vibration into electrical oscillation. The higher the electromechanical coupling factor, the better is the efficiency of interconversion. On the other hand, the mechanical quality factor shows the reciprocal proportion of the energy consumed by the material during the energy conversion. The larger the mechanical quality factor, the smaller is the energy consumption.

One of the typical fields of application of piezoelectric materials is the manufacture of the elements of ceramic filters. In this case, it is necessary to furnish the electromechanical coupling factor with an optimum value selected from a wide range between an extremely great value and a very small value, and it is desirable for the mechanical quality factor to assume as large a value as possible. This fact is fully described in, for example, R. C. V. Macario, "Design Data for Band-Pass Ladder Filter Employing Ceramic Resonators," which appears in Electronic Engineering, vol. 33, No. 3, (1961) pp. 171–177.

The transducer elements of mechanical filters provide another important field of application of piezoelectric ceramics. In this case, both the electromechanical coupling factor and the mechanical quality factor should be as large as possible.

It is known that conventional piezoelectric ceramics, for example, barium titanate ($BaTiO_3$) and lead titanate zirconate [$Pb(Ti.Zr)O_3$] provide an electromechanical coupling factor and a mechanical quality factor one and/or both of which exhibit extremely small values and hence are usually not practical. In particular, the mechanical quality factor has often been so small as to make the practical use of the ceramics impossible. Attempts have been made to improve these factors by incorporating various additional constituents into the ceramics, such as lead titanate zirconate ceramics, but in most cases such constituents have resulted in an improvement of only one of the two factors. Up to now, these two factors have not been improved simultaneously.

The object of this invention is, therefore, to provide novel piezoelectric ceramics which exhibit large values of both the electromechanical coupling factor and the mechanical quality factor.

The other object of this invention is to provide novel piezoelectric ceramics suitable for use in various fields, such as the manufacture of the elements for ceramic filters and transducer elements of mechanical filters.

The piezoelectric ceramics of this invention are featured by compositions consisting essentially of a solid solution of the $$Me(Mn_{1/2}Ti_{1/2})O_3—Me(Mn_{1/2}Zr_{1/2})O_3—PbTiO_3—PbZrO_3$$

quaternary wherein Me represents one element selected from Bi, La, Ce, Nd, and Sm, and wherein the ceramic shows excellent piezoelectric properties and is practically useful.

These ceramic compositions contain lead (Pb) and manganese (Mn) as divalent metallic elements, titanium (Ti) and zirconium (Zr) as tetravalent metallic elements, and also the element Me [bismuth (Bi), lanthanum (La), cerium (Ce), neodymium (Nd), or samarium (Sm)] as a tetravalent metallic element. At least one of the elements barium, strontium and calcium may be substituted for up to about 25 atom percent of lead contained in the above compositions.

The ceramic compositions of the quaternary system $$Me(Mn_{1/2}Ti_{1/2})O_3—Me(Mn_{1/2}Zr_{1/2})O_3—PbTiO_3—PbZrO_3$$

may be represented by the compositional formula $$[Me(Mn_{1/2}Ti_{1/2})O_3]_t[Me(Mn_{1/2}Zr_{1/2})O_3]_u[PbTiO_3]_v[PbZrO_3]_w$$

where $t$, $u$, $v$ and $w$ denote a set of molecular ratios and where $$t+u+v+w=1.00$$

The molecular ratios $t$, $u$, $v$ and $w$ can be represented by two variables $\alpha$ and $\beta$, which in turn indicate the ratio of the number of Me atoms to Me and Pb atoms, and the number of Ti atoms to Ti and Zr atoms, respectively as follows:

$$\alpha=t/(t+v)=u/(u+w)$$

$$\beta=t/(t+u)=v/(v+w)$$

It has been found that where bismuth (Bi) is selected for Me, the particularly desirable piezoelectric properties are possessed by compositions lying within the range determined by the following combinations of $\alpha$ and $\beta$:

| $\alpha$: | $\beta$ |
|---|---|
| 0.01 | 0.60 |
| 0.01 | 0.09 |
| 0.10 | 0.00 |
| 0.20 | 0.20 |
| 0.20 | 0.70 |
| 0.05 | 0.70 |
| 0.02 | 0.65 |

Where lanthanum (La) is selected for Me, it has been discovered that the compositions lying within the range determined by the following combinations of $\alpha$ and $\beta$ have excellent piezoelectric properties:

| $\alpha$: | $\beta$ |
|---|---|
| 0.01 | 0.60 |
| 0.01 | 0.10 |
| 0.05 | 0.20 |
| 0.10 | 0.30 |
| 0.15 | 0.48 |
| 0.15 | 0.70 |
| 0.10 | 0.80 |
| 0.05 | 0.80 |

It has been further found that the ceramic compositions having excellent piezoelectric properties lie within the range determined by the following combinations of $\alpha$ and $\beta$, when cerium (Ce) is selected for Me:

| $\alpha$: | $\beta$ |
|---|---|
| 0.01 | 0.60 |
| 0.01 | 0.10 |
| 0.05 | 0.10 |
| 0.20 | 0.40 |
| 0.20 | 0.70 |
| 0.10 | 0.80 |
| 0.05 | 0.80 |

Excellent piezoelectric properties of the ceramic compositions of this invention will be apparent from the following description of preferred examples of this invention, as illustrated in the accompanying drawings.

Figure 1:
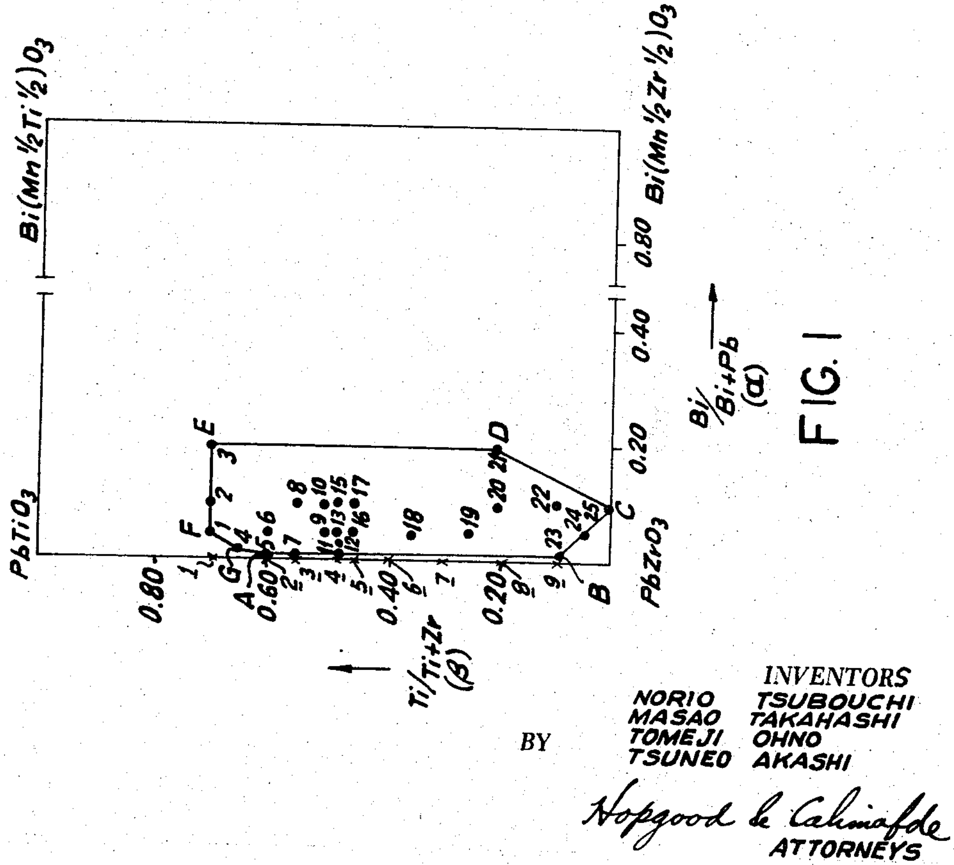
Figure 2A:
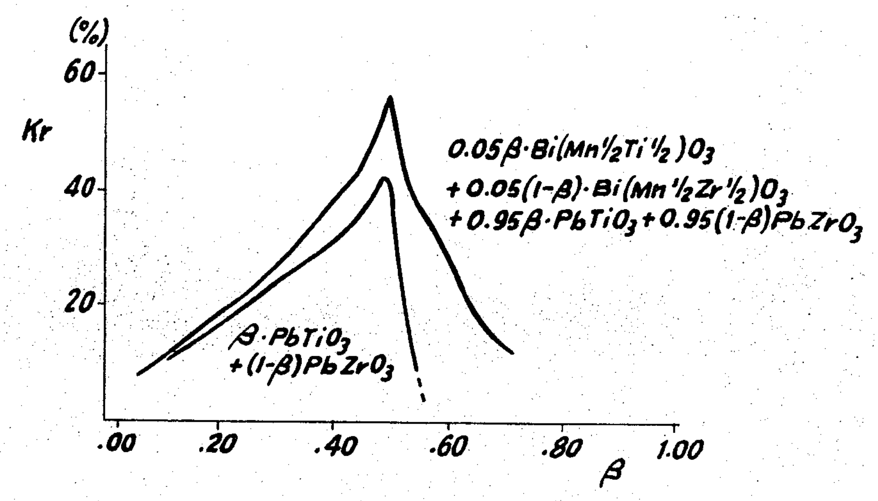
Figure 2B:
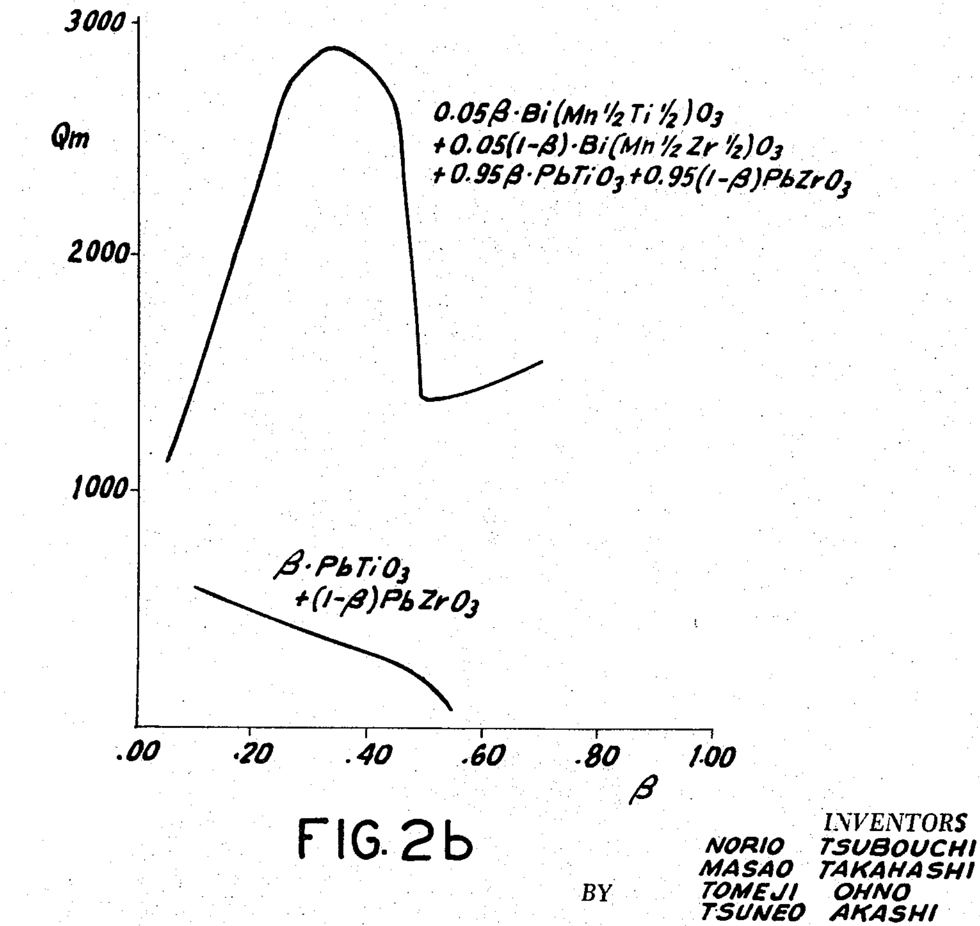
Figure 4:
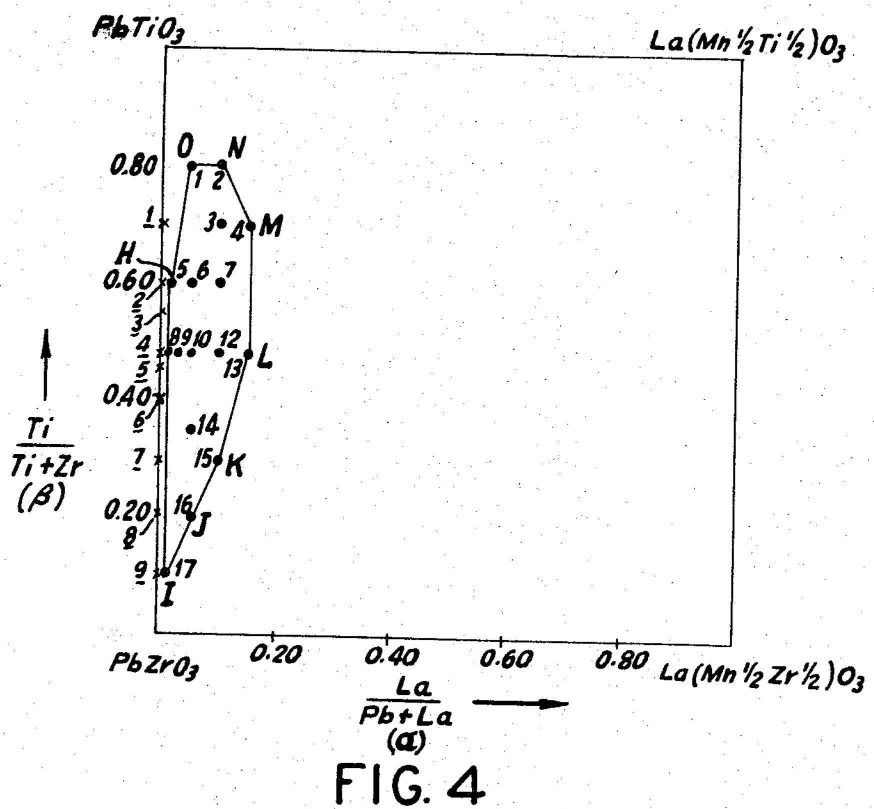
Figure 6:
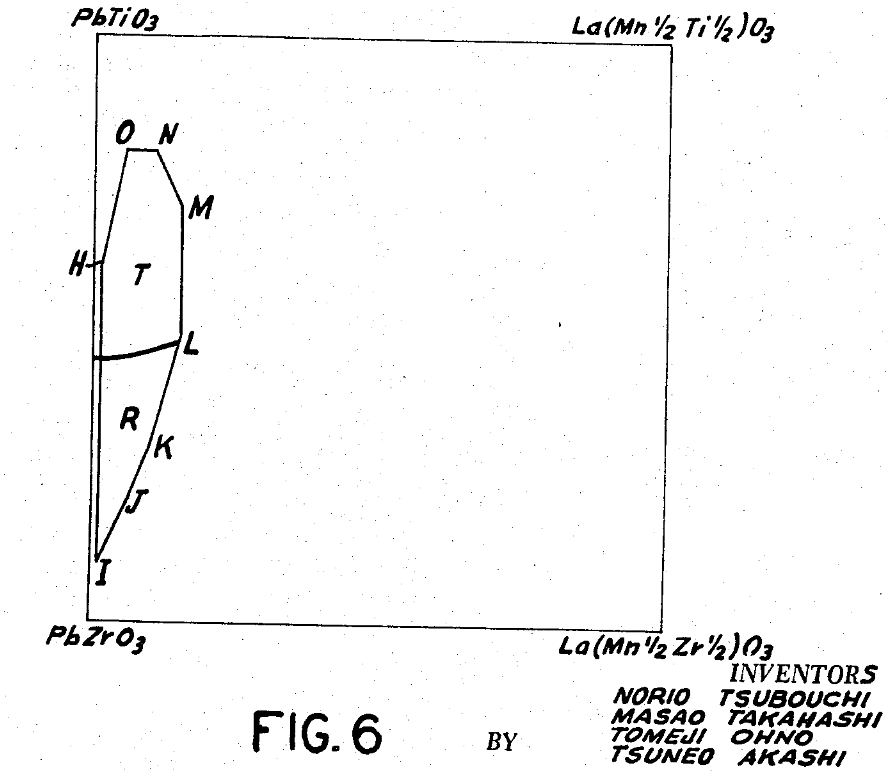
Figure 5A:
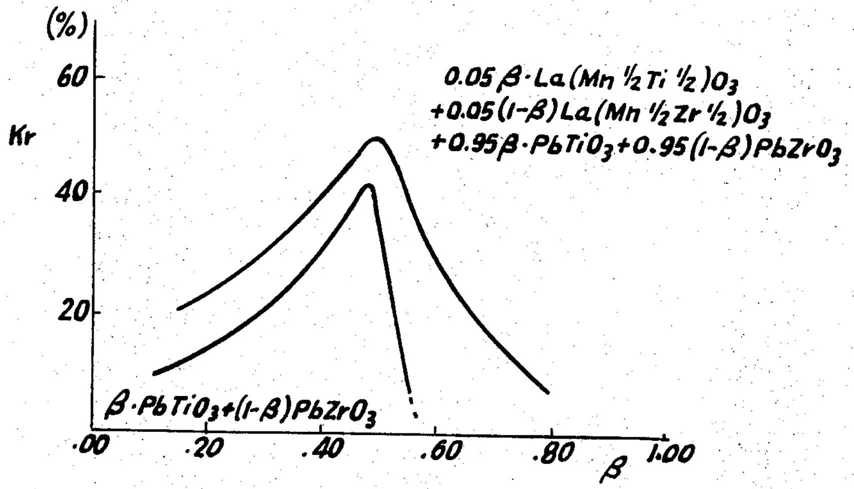
Figure 5B:
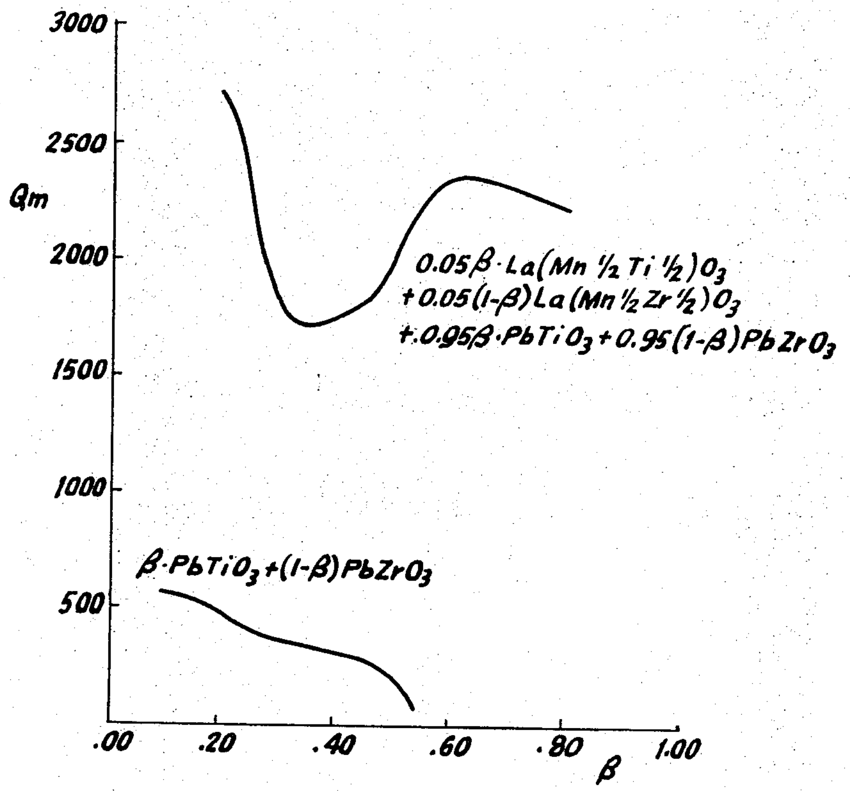
Figure 7:
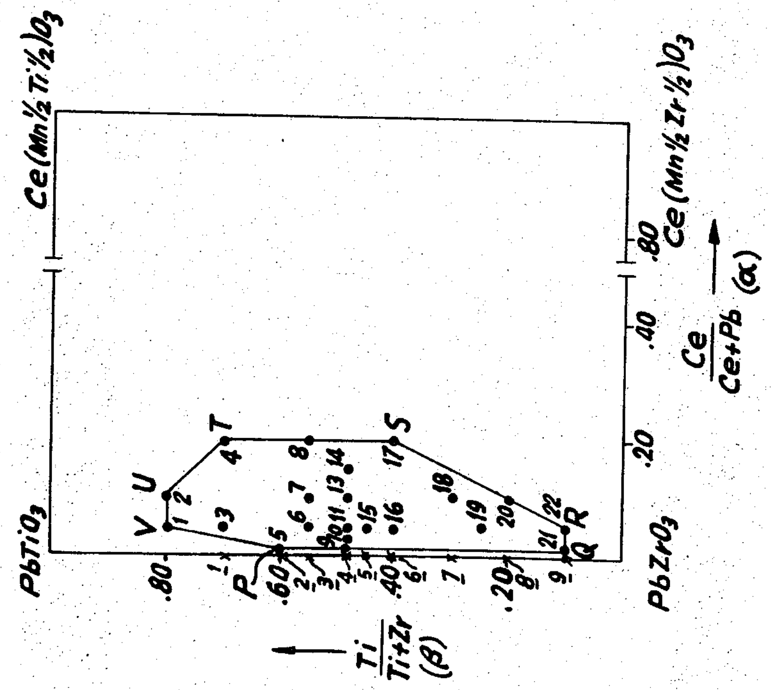
Figure 9:
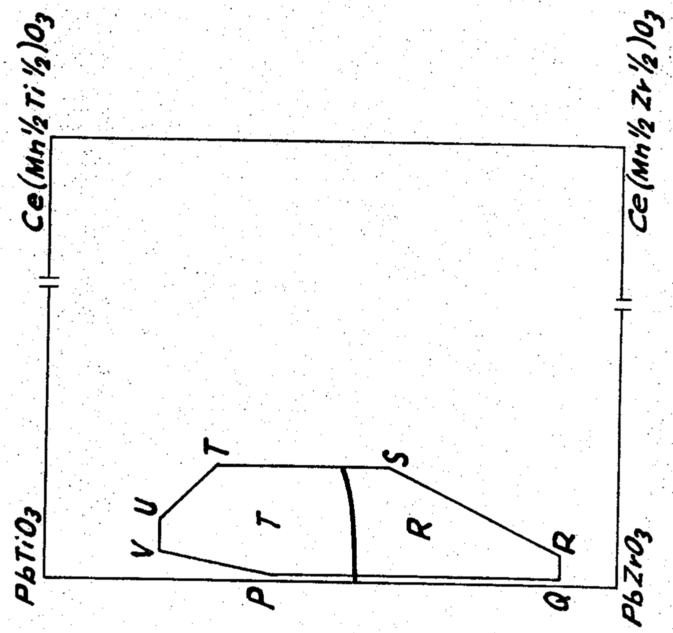
Figure 8A:
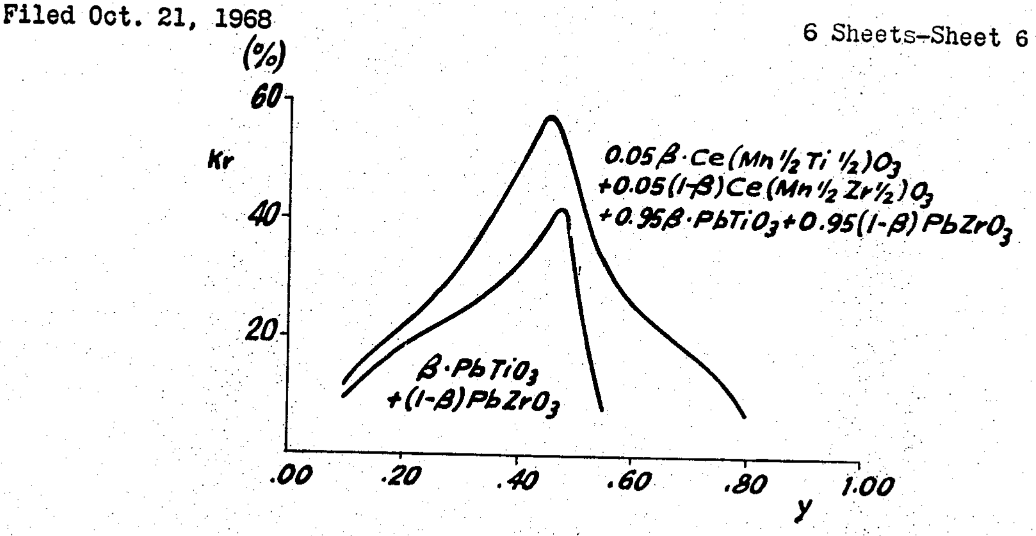
Figure 8B:
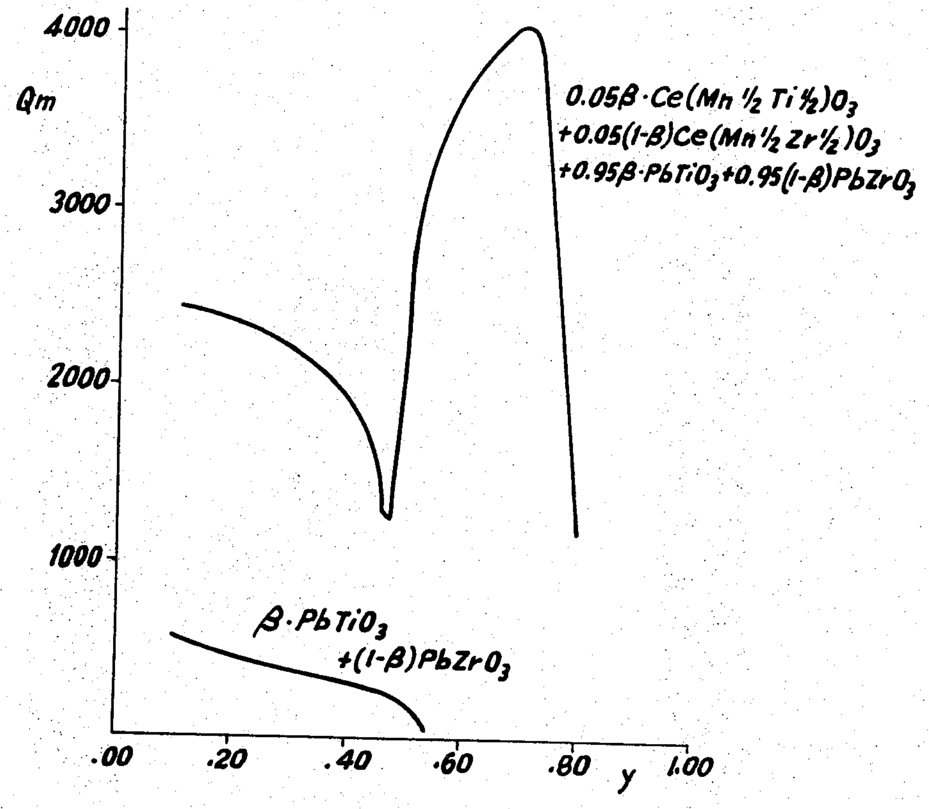

In the drawings:

FIGS. 1, 4 and 7 are composition diagrams depicting both the effective ranges of the compositions of this invention and the specific compositions as exemplified in the Examples;

FIGS. 2(a), 2(b), 5(a), 5(b), 8(a) and 8(b) are graphs showing the electromechanical coupling factors 2(a) and the mechanical quality factors 2(b) of both the conventional lead titanate zironate ceramics and the ceramics of this invention, as a function of change in the lead titanate contents in both the ceramics, and FIGS. 3, 6 and 9 are phase diagrams of the compositions of this invention; while FIGS. 1, 2 and 3 are for the noval quaternary system $Bi(Mn_{1/2}Ti_{1/2})O_3$—$Bi(Mn_{1/2}Zr_{1/2})O_3$—$PbTiO_3$—$PbZrO_3$ included among the ceramic compositions of this invention;

FIGS. 4, 5 and 6 are for the noval quaternary system $La(Mn_{1/2}T_{1/2})O_3$—$La(Mn_{1/2}Zr_{1/2})O_3$—$PbTiO_3$—$PbZrO_3$ included among the ceramic compositions of this invention; and FIGS. 7, 8 and 9 are for the novel ceramic material of $Ce(Mn_{1/2}Ti_{1/2})O_3$
—$Ce(Mn_{1/2}Zr_{1/2})O_3$—$PbTiO_3$—$PbZrO_3$ quaternary system of this invention.

EXAMPLES

Powdered materials of lead monoxide (PbO), manganese carbonate ($MnCO_3$), titanium dioxide ($TiO_2$), zirconium dioxide ($ZrO_2$) and an oxide of the element Me (Bi, La, Ce, Nd or Sm) were used as starting materials in producing the $Me(Mn_{1/2}Ti_{1/2})O_3$—$Me(Mn_{1/2}Zr_{1/2})O_3$—$PbTiO_3$—$PbZr\beta_3$ ceramics of this invention, unless otherwise stated. The oxides of the element Me used were bismuth sesquioxide ($Bi_2O_3$) for Bi, lanthanum sesquioxide ($La_2O_3$) for La, cerium dioxide ($CeO_2$) for Ce, neodymium sesquioxide ($Nd_2O_3$) for Nd, and samarium sesquioxide ($Sm_2O_3$) for Sm. The materials were proportioned to produce $Bi(Mn_{1/2}Ti_{1/2})O_3$—$Bi(Mn_{1/2}Zr_{1/2})O_3$—$PbTiO_3$—$PbZrO_3$ ceramics having $\alpha$ and $\beta$ values shown in Table 1; $LaMn_{1/2}Ti_{1/2})O_3$—$La(Mn_{1/2}Zr_{1/2})O_3$—$PbTiO_3$—$PbZrO_3$ ceramics having $\alpha$ and $\beta$ values shown in Table 2; $Ce(Mn_{1/2}Ti_{1/2})O_3$—$Ce(Mn_{1/2}Zr_{1/2})O_3$—$PbTiO_3$—$PbZrO_3$ ceramics having $\alpha$ and $\beta$ values shown in Table 3;

$Nd(Mn_{1/2}Ti_{1/2})O_3$
—$Nd(Mn_{1/2}Zr_{1/2})O_3$—$PbTiO_3$—$PbZrO_3$ ceramics with $\alpha$ and $\beta$ shown in Table 4; and $Sm(Mn_{1/2}Ti_{1/2})O_3$
—$Sm(Mn_{1/2}Zr_{1/2})O_3$—$PbTiO_3$—$PbZrO_3$ ceramics with $\alpha$ and $\beta$ shown in Table 5. The amount of manganese carbonate ($MnCO_3$) and cerium dioxide ($CeO_2$) was calculated on the basis of manganese monoxide (MnO) and cerium sesquioxide ($CeO_3$), respectively. In addition, the materials lead monoxide, titanium dioxide and zirconium dioxide were proportioned to produce the conventional lead titanate zirconate ceramics having the compositional proportions shown in Table 6.

The respective compositions were mixed in a ball mill with distilled water, the mixed powder being thereafter subjected to filtration, then dried, crushed, presintered at 900° C. for one hour, and again crushed. As for the specimens of Table 1, the presintering was carried out at 850° C. Thereafter, the mixtures, with a small amount of distilled water added thereto, were then press-molded into discs of 20 mm. in diameter at a pressure of 700 kg./cm.$^2$ and sintered for one hour at a temperature of 1250° C. to 1300° C. As for the specimens of Table 1, the sintering temperature was 1260° C. to 1300° C. for $\alpha$ ranging up to 0.10, or 1220° C. in case of $\alpha$ exceeding more than 0.10. The resulting ceramic discs were polished on both surfaces to the thickness of one millimeter and provided with silver electrodes on both surfaces. Thereafter, they were piezoelectrically activated through the polarization treatment for one hour at 100° C. under an applied D.C. electric field of 50 kv./cm. for those specimens for ranging up to 0.10, or at room temperature under a D.C. electric field of 40 kv./cm. for those specimens in which $\alpha$ exceeds 0.10, except for those specimens of $\alpha$ ranging up to 0.05 and more than 0.05 of Table 1, where 100° C.; 40 kv./cm. and 100° C.; 30 kv./cm. were respectively used.

After the ceramic discs had been allowed to stand for 24 hours, the electromechanical coupling factor for the radial mode vibration ($k_r$) and the mechanical quality factor ($Q_m$) were measured to evaluate the piezoelectric activities. The measurement of these piezoelectric properties was made according to the IRE standard circuit. The value of $K_r$ was calculated by the resonant to antiresonant frequency method. The dielectric constant ($\epsilon$) and the dielectric loss (tan $\delta$) were also measured at a frequency of 1 kHz. and at room temperature.

Tables 1 through 6 are illustrative of the typical results obtained. In the tables, the specimens are arranged according to the value of $\beta$ and there are also listed several values of Curie temperatures which were determined through measurement of temperature variation in the dielectric constant ($\epsilon$). The novel compositions of the specimens of Tables 1, 2 and 3 are shown with black points in FIGS. 1, 4 and 7, respectively, while the conventional compositions of the specimens of Table 6 are indicated by crosses in the same figures.

The results for the specimens Nos. 9 and 12 of Table 1, Nos. 9 and 10 of Table 2, Nos. 10 and 15 of Table 3, No. 1 of Table 4, and No. 1 of Table 5 show that the ceramics of this invention have extremely large values of both $k_r$ and $Q_m$. In the specimens Nos. 16, 18 and 19 of Table 1, Nos. 3, 6 and 16 of Table 2 and Nos. 3 and 6 of Table 3, increase in the $Q_m$ value is particularly noted. Comparison of these results with those for the specimens Nos. 4 and 9 of Table 6 will reveal that the greatest $k_r$ and $Q_m$ values of the novel ceramics of this invention are far superior to the maximum $k_r$ and $Q_m$ values of the conventional lead titanate zirconate ceramics which have been known as the most excellent piezoelectric ceramic material. Moreover, comparison of the results in Table 1, 2, 3, 4 or 5 and Table 6, particularly between the novel and conventional ceramics in which $\beta$ values are same or similar to each other, indicates that both $k_r$ and $Q_m$ are remarkably improved in the ceramics provided by the invention. This latter fact will be more clearly understood from FIG. 2(a), FIG. 2(b), FIG. 5(a), FIG. 5(b) or FIG. 8(a) and FIG. 8(b), wherein the curves (a) and (b) represent the $k_r$ and the $Q_m$ values of novel ceramics with the $\alpha$ value being fixed at 0.5 and the $\beta$ value being varied, and of the conventional lead titanate zirconate ceramics with the varying $\beta$ value.

As is seen from the above, the invention provides new and useful piezoelectric ceramics having large values of both $k_r$ and $Q_m$.

In the novel ceramics of $Bi(Mn_{1/2}Ti_{1/2})O_3$—$Bi(Mn_{1/2}Zr_{1/2})O_3$
—$PbTiO_3$—$PbZrO_3$ quaternary system, superior piezoelectric properties are available when the compositions lie within the Area A–B–C–D–E–F–G of FIG. 1 of the drawing. Also, excellent piezoelectric properties are possessed by the compositions lying within the area H–I–J–K–L–M–N–O of FIG. 4 of the drawing with respect to the $$La(Mn_{1/2}Ti_{1/2})O_3—La(Mn_{1/2}Zr_{1/2})O_3—PbTiO_3—PbZrO_3$$

system ceramics, and within the area P–Q–R–S–T–U–V of FIG. 7 of the drawing in case of the $$Ce(Mn_{1/2}Ti_{1/2})O_3—Ce(Mn_{1/2}Zr_{/12})O_3—PbTiO_3—PbZrO_3$$

ceramics. The sets of $\alpha$ and $\beta$ values of the vertices of the areas A–B–C–D–E–F–G, H–I–J–K–L–M–N–O and P–Q–R–S–T–U–V are as follows:

| | $\alpha$ | $\beta$ | | $\alpha$ | $\beta$ |
|---|---|---|---|---|---|
| A | 0.01 | 0.60 | L | 0.15 | 0.48 |
| B | 0.01 | 0.09 | M | 0.15 | 0.70 |
| C | 0.10 | 0.00 | N | 0.10 | 0.80 |
| D | 0.20 | 0.20 | O | 0.05 | 0.80 |
| E | 0.20 | 0.70 | P | 0.01 | 0.60 |
| F | 0.05 | 0.70 | Q | 0.01 | 0.10 |
| G | 0.02 | 0.65 | R | 0.05 | 0.10 |
| H | 0.01 | 0.60 | S | 0.20 | 0.40 |
| I | 0.01 | 0.10 | T | 0.20 | 0.70 |
| J | 0.05 | 0.20 | U | 0.10 | 0.80 |
| K | 0.10 | 0.30 | V | 0.05 | 0.80 |

Where the $a$ value is less than that lying within the above-mentioned area, the piezoelectric properties of the ceramics obtained are inferior to or nearly equal to those of the conventional lead titanate zirconate ceramics. Where the $\beta$ value is more than that falling within the above-mentioned area, it is difficult to sinter the composition and the piezoelectric activity of the ceramics so deteriorates as to render them substantially useless. In the situation where the value does not fall within the area, generally the sintering and polarizing treatments are difficult and the piezoelectric properties of the ceramics are inferior.

In the light of the above, it has been found that the $$Me(Mn_{1/2}Ti_{1/2})O_3—Me(Mn_{1/2}Zr_{1/2})O_3—PbTiO_3—PbZrO_3$$

ceramics of the invention in which Me is Bi, La or Ce, the compositions should fall within any of the areas specified in the drawings. The ceramics of these desirable compositions show excellent piezoelectric properties and have a high Curie temperature, as shown in Tables 1 through 3, whereby the piezoelectric activity is retained at up to elevated temperature. It will be apparent that similar desirable compositions may be provided in which Me is Nd or Sm.

The quaternary system of this invention exists in a solid solution in greater parts of compositions and such a solid solution has a perovskite-type crystalline structure. FIGS. 3, 6 and 9 show the crystalline phases of the ceramic compositions lying within the areas A–B–C–D–E–F–G of FIG. 1; H–I–J–K–L–M–N–O of FIG. 4; and P–Q–R–S–T–U–V of FIG. 7, respectively, as determined at room temperature by the powder method of X-ray analysis. These compositions have a perovskite-type crystalline structure and belong to either the tetragonal phase (indicated by "T" in the figures) or the rhombohedral phase (indicated by "R"). The morphotropic phase boundary is shown with a thick line in each figure. In general, $k_r$ is extremely great for the compositions in the vicinity of this phase boundary, while $Q_m$ is extremely large for the compositions remote from this phase boundary.

It will be apparent that the starting materials to be used in manufacture of the ceramics of this invention are not limited to those used in the above examples. For example, those oxides which are easily decomposed at elevated temperature to form the required compositions may be used in place of the starting materials given in the examples, as exemplified by substituting $Pb_3O_4$ for PbO and $MnO_2$ for $MnCO_3$. Also, those salts such as oxalates or carbonates may be used instead of the oxides used in the examples, since they are easily decomposed into their respective oxides at elevated temperature. Likewise, hydroxides of the same character as above may be used instead of the oxides. Moreover, excellent piezoelectric ceramics having similar properties to the above examples may be obtained by separately preparing the powdered material of each of $Me(Mn_{1/2}Ti_{1/2})O_3$—Me represents Bi, La, Ce, Nd or Sm), $Me(Mn_{1/2}Zr_{1/2})O_3$, $PbTiO_3$ and $PbZrO_3$ in advance and by using them as starting materials for subsequent mixing.

The examples No. 14 of Table 1; No. 11 of Table 2; No. 12 of Table 3; No. 2 of Table 4 and No. 2 of Table 5 reveal that excellent piezoelectric properties are obtained by the compositions even when a part of lead is replaced by strontium. In general, piezoelectric properties of compositions of the type containing lead titanate or zirconate are retained even when up to about 25 atom percent of lead contained in the compositions is replaced by at least one of the elements barium, strontium and calcium.

Usually the zirconium dioxide ($ZrO_2$) available in the market contains several percent of hafnium dioxide ($HfO_2$). Accordingly, the ceramic compositions of this invention may contain small amounts of such oxides or elements as existing in the materials available in the market. Moreover, it is expected that additions of a small amount of some additional constituent to the ceramic compositions of this invention may further improve the piezoelectric properties, as recognized for conventional lead titanate zirconate ceramics. It will be understood from the foregoing that the ceramic compositions of this invention may include appropriate additives without adversely affecting the piezoelectric properties.

Although the present invention has been described in conjunction with preferred embodiments, it is to be understood that modifications and variations may be restored to without departing from the spirit and scope of the invention as those skilled in the art will readily understand. Such modifications and variations are considered to be within the purview and scope of the invention and the appended claims.

TABLE 1

| No. | Composition $\frac{Bi}{Bi+Pb}$ ($\alpha$) | Composition $\frac{Ti}{Ti+Zr}$ ($\beta$) | $k_r$, percent | $Q_m$ | $\epsilon$ | Tan $\delta$, percent | Curie temp. (° C.) |
|---|---|---|---|---|---|---|---|
| 1 | 0.05 | 0.70 | 12 | 1,560 | 185 | 1.8 | -------- |
| 2 | 0.10 | 0.70 | 10 | 1,770 | 170 | 2.2 | -------- |
| 3 | 0.20 | 0.70 | 18 | 360 | 375 | 5.2 | -------- |
| 4 | 0.02 | 0.56 | 9 | 1,800 | 235 | 2.2 | -------- |
| 5 | 0.01 | 0.60 | 4 | 970 | 390 | 1.2 | -------- |
| 6 | 0.05 | 0.60 | 23 | 1,450 | 420 | 1.4 | -------- |
| 7 | 0.01 | 0.55 | 8 | 820 | 510 | 1.3 | -------- |
| 8 | 0.10 | 0.55 | 41 | 1,360 | 880 | 2.3 | -------- |
| 9 | 0.05 | 0.50 | 56 | 1,390 | 810 | 1.6 | -------- |
| 10 | 0.10 | 0.50 | 45 | 1,360 | 450 | 1.9 | -------- |
| 11 | 0.01 | 0.48 | ,37 | 410 | 1,030 | 1.3 | -------- |
| 12 | 0.02 | 0.48 | 61 | 1,050 | 790 | 1.3 | -------- |
| 13* | 0.05 | 0.48 | 50 | 1,800 | 830 | 1.4 | 345 |
| 14*** | 0.05 | 0.48 | 48 | 1,700 | 470 | 1.5 | -------- |
| 15 | 0.10 | 0.48 | 42 | 1,550 | 400 | 1.7 | 315 |
| 16 | 0.05 | 0.45 | 44 | 2,640 | 380 | 1.1 | -------- |
| 17* | 0.10 | 0.45 | 37 | 1,650 | 390 | 1.6 | -------- |
| 18 | 0.05 | 0.35 | 37 | 2,920 | 270 | 1.2 | -------- |
| 19 | 0.05 | 0.25 | 22 | 2,600 | 220 | 1.3 | -------- |
| 20 | 0.10 | 0.20 | 15 | 1,370 | 260 | 1.6 | -------- |
| 21 | 0.20 | 0.20 | 8 | 700 | 445 | 4.5 | -------- |
| 22 | 0.10 | 0.10 | 11 | 1,160 | 240 | 1.6 | -------- |
| 23 | 0.01 | 0.09 | 8 | 880 | 210 | 2.1 | -------- |
| 24 | 0.05 | 0.05 | 7 | 1,130 | 170 | 2.8 | -------- |
| 25 | 0.10 | 0.00 | 5 | 970 | 180 | 5.8 | -------- |

TABLE 2

| No. | Composition $\frac{La}{La+Pb}$ ($\alpha$) | Composition $\frac{Ti}{Ti+Zr}$ ($\beta$) | $k_r$, percent | $Q_m$ | $\epsilon$ | Tan $\delta$, percent | Curie temp. (° C.) |
|---|---|---|---|---|---|---|---|
| 1 | 0.05 | 0.80 | 7 | 2,240 | 260 | 1.5 | |
| 2 | 0.10 | 0.80 | 15 | 1,800 | 360 | 2.1 | |
| 3* | 0.10 | 0.70 | 20 | 2,310 | 470 | 2.0 | |
| 4 | 0.15 | 0.70 | 11 | 1,780 | 860 | 2.6 | |
| 5 | 0.01 | 0.60 | 7 | 440 | 340 | 1.5 | |
| 6* | 0.05 | 0.60 | 29 | 2,360 | 480 | 3.0 | |
| 7 | 0.10 | 0.60 | 27 | 1,490 | 750 | 4.1 | |
| 8 | 0.01 | 0.48 | 33 | 460 | 1,110 | 1.9 | |
| 9 | 0.02 | 0.48 | 52 | 1,420 | 1,290 | 0.9 | |
| 10 | 0.05 | 0.48 | 50 | 1,870 | 1,090 | 1.3 | 385 |
| 11*** | 0.05 | 0.48 | 47 | 1,700 | 1,120 | 1.4 | |
| 12 | 0.10 | 0.48 | 33 | 1,410 | 1,550 | 1.5 | 175 |
| 13 | 0.15 | 0.48 | 15 | 1,150 | 1,810 | 4.1 | |
| 14 | 0.05 | 0.35 | 36 | 1,710 | 410 | 1.1 | |
| 15 | 0.10 | 0.30 | 5 | 2,580 | 1,470 | 2.4 | |
| 16 | 0.05 | 0.20 | 24 | 2,700 | 340 | 1.1 | |
| 17 | 0.01 | 0.10 | 8 | 780 | 270 | 3.0 | |

TABLE 3

| No. | Composition $\frac{Ce}{Ce+Pb}$ ($\alpha$) | Composition $\frac{Ti}{Ti+Zr}$ ($\beta$) | $k_r$, percent | $Q_m$ | $\epsilon$ | Tan $\delta$, percent | Curie temp. (° C.) |
|---|---|---|---|---|---|---|---|
| 1 | 0.05 | 0.80 | 8 | 1,100 | 180 | 1.6 | |
| 2 | 0.10 | 0.80 | 9 | 1,190 | 240 | 1.4 | |
| 3 | 0.05 | 0.70 | 18 | 4,080 | 340 | 1.1 | |
| 4 | 0.20 | 0.70 | 5 | 220 | 660 | 4.1 | |
| 5 | 0.01 | 0.60 | 13 | 840 | 360 | 1.2 | |
| 6 | 0.05 | 0.55 | 32 | 3,330 | 700 | 1.1 | |
| 7* | 0.10 | 0.55 | 36 | 1,090 | 1,120 | 1.9 | |
| 8 | 0.20 | 0.55 | 11 | 120 | 1,210 | 5.3 | |
| 9 | 0.01 | 0.48 | 35 | 430 | 1,160 | 1.2 | |
| 10 | 0.02 | 0.48 | 60 | 1,060 | 1,350 | 1.4 | 360 |
| 11 | 0.05 | 0.48 | 55 | 1,230 | 1,360 | 1.3 | 320 |
| 12*** | 0.05 | 0.48 | 53 | 1,250 | 1,420 | 1.4 | |
| 13 | 0.10 | 0.48 | 39 | 890 | 1,160 | 2.0 | 255 |
| 14 | 0.15 | 0.48 | 28 | 880 | 1,370 | 4.0 | 190 |
| 15* | 0.05 | 0.45 | 58 | 1,680 | 830 | 1.3 | |
| 16 | 0.05 | 0.40 | 48 | 1,910 | 670 | 1.2 | |
| 17 | 0.20 | 0.40 | 4 | 220 | 1,120 | 6.4 | |
| 18** | 0.10 | 0.30 | 17 | 1,620 | 1,010 | 3.6 | |
| 19 | 0.05 | 0.25 | 27 | 2,330 | 510 | 1.1 | |
| 20 | 0.10 | 0.20 | 11 | 2,120 | 480 | 2.2 | |
| 21 | 0.01 | 0.10 | 12 | 910 | 250 | 2.5 | |
| 22 | 0.05 | 0.10 | 12 | 2,450 | 450 | 1.1 | |

TABLE 4

| No. | Composition $\frac{Nd}{Nd+Pb}$ ($\alpha$) | Composition $\frac{Ti}{Ti+Zr}$ ($\beta$) | $k_r$, percent | $Q_m$ | $\epsilon$ | Tan $\delta$, percent |
|---|---|---|---|---|---|---|
| 1 | 0.05 | 0.48 | 50 | 820 | 1,280 | |
| 2*** | 0.05 | 0.48 | 48 | 900 | 1,350 | |
| 3 | 0.10 | 0.48 | 31 | 770 | 1,520 | |

TABLE 5

| No. | Composition $\frac{Sm}{Sm+Pb}$ ($\alpha$) | Composition $\frac{Ti}{Ti+Zr}$ ($\beta$) | $k_r$, percent | $Q_m$ | $\epsilon$ | Tan $\delta$, percent |
|---|---|---|---|---|---|---|
| 1 | 0.05 | 0.48 | 48 | 570 | 1,220 | |
| 2*** | 0.05 | 0.48 | 45 | 630 | 1,310 | |
| 3 | 0.10 | 0.48 | 39 | 360 | 1,170 | |

Notes to Tables 1 to 5:

In manufacture of the specimens whose numbers have a single asterisk (*), triplumbic tetroxide ($Pb_3O_4$) was used instead of lead monoxide (PbO) as one of the starting materials.

For the specimen with double asterisks (**), manganese dioxide ($MnO_2$) calculated on the basis of manganese monoxide (MnO) was used as one of the starting materials.

In manufacture of the specimen with triple asterisks (***), strontium carbonate ($SrCO_3$) calculated on the basis of strontium monoxide (SrO) was used, to replace 5 atom percent of lead (Pb) by strontium (Sr), in addition to the starting materials.

TABLE 6

| No. | Composition $\alpha$ | Composition $\beta$ | $k_r$, percent | $Q_m$ | $\epsilon$ | Tan $\delta$, percent |
|---|---|---|---|---|---|---|
| 1 | 0.00 | 0.70 | | | 340 | 5.7 |
| 2 | 0.00 | 9.60 | | | 300 | 2.4 |
| 3 | 0.00 | 0.55 | 8 | 30 | 350 | 1.3 |
| 4 | 0.00 | 0.48 | 42 | 259 | 1,060 | 1.6 |
| 5 | 0.00 | 9.45 | 38 | 290 | 640 | 3.0 |
| 6 | 0.00 | 0.40 | 30 | 320 | 460 | 3.1 |
| 7 | 0.00 | 0.30 | 24 | 380 | 380 | 3.3 |
| 8 | 0.00 | 0.20 | 15 | 470 | 350 | 3.3 |
| 9 | 0.00 | 0.10 | 10 | 500 | 280 | 3.4 |

NOTE.—With regard to specimens Nos. 1 and 2, evaluation of piezoelectric activity was not possible.

What is claimed is:

1. A piezoelectric ceramic material consisting essentially of a composition represented by the formula:

$$[Me(Mn_{1/2}Ti_{1/2})O_3]_t[Me(Mn_{1/2}Zr_{1/2})O_3]_u[PbTiO_3]_v[PbZrO_3]_w$$

where $t$, $u$, $v$ and $w$ denote a set of molecular ratios and $t+u+v+w=1.00$, where Me represents one of the elements bismuth, lanthanum, cerium, which composition falls within the area A–B–D–E–F–G of FIG. 1 of the drawing where bismuth is selected for Me; within the area H–I–J–K–L–M–N–O of FIG. 4 of the drawing where lanthanum is selected for Me, and within the area P–Q–R–S–T–U–V of FIG. 7 of the drawing where cerium is selected for Me, the vertices of said areas being determined by the following combinations of $\alpha$ and $\beta$, where said $\alpha$ and $\beta$ are respectively given by $$\alpha=t/(t+v)=u/(u+w) \text{ and } \beta=t/(t+u)=v/(v+w):$$

| | $\alpha$ | $\beta$ | | $\alpha$ | $\beta$ |
|---|---|---|---|---|---|
| A | 0.01 | 0.60 | L | 0.15 | 0.48 |
| B | 0.01 | 0.09 | M | 0.15 | 0.70 |
| C | 0.10 | 0.00 | N | 0.10 | 0.80 |
| D | 0.20 | 0.20 | O | 0.05 | 0.80 |
| E | 0.20 | 0.70 | P | 0.01 | 0.60 |
| F | 0.05 | 0.70 | Q | 0.01 | 0.10 |
| G | 0.02 | 0.65 | R | 0.05 | 0.10 |
| H | 0.01 | 0.60 | S | 0.20 | 0.40 |
| I | 0.01 | 0.10 | T | 0.20 | 0.70 |
| J | 0.05 | 0.20 | U | 0.10 | 0.80 |
| K | 0.10 | 0.30 | V | 0.05 | 0.80 |

2. The piezoelectric ceramic material of claim 1, wherein up to about 25 atom percent of lead is replaced by at least one element selected from the group consisting of barium, strontium and calcium.

References Cited

FOREIGN PATENTS 888,740 2/1962 Great Britain.
1,141,858 Great Britain.

TOBIAS E. LEVOW, Primary Examiner

J. COOPER, Assistant Examiner

U.S. Cl. X.R.

106—39